US012726841B2

(12) United States Patent
Yiu

(10) Patent No.: US 12,726,841 B2
(45) Date of Patent: Sep. 1, 2026

(54) CONFIGURATION OF MEASUREMENT GAPS IN NEW RADIO (NR)-NR DUAL CONNECTIVITY (NR-NR DC) ARRANGEMENTS

(71) Applicant: Apple Inc., Cupertino, CA (US)

(72) Inventor: Candy Yiu, Portland, OR (US)

(73) Assignee: Apple, Inc., Cupertino, CA (US)

(*) Notice: Subject to any disclaimer, the term of this patent is extended or adjusted under 35 U.S.C. 154(b) by 946 days.

(21) Appl. No.: 17/275,495

(22) PCT Filed: Sep. 24, 2019

(86) PCT No.: PCT/US2019/052695
§ 371 (c)(1),
(2) Date: Mar. 11, 2021

(87) PCT Pub. No.: WO2020/068828
PCT Pub. Date: Apr. 2, 2020

(65) Prior Publication Data

US 2022/0124529 A1 Apr. 21, 2022

Related U.S. Application Data

(60) Provisional application No. 62/735,711, filed on Sep. 24, 2018.

(51) Int. Cl.
*H04W 24/10* (2009.01)
*H04W 36/00* (2009.01)
*H04W 76/27* (2018.01)

(52) U.S. Cl.
CPC ........... *H04W 24/10* (2013.01); *H04W 76/27* (2018.02); *H04W 36/0069* (2018.08)

(58) Field of Classification Search
USPC .......................................................... 370/252
See application file for complete search history.

(56) References Cited

U.S. PATENT DOCUMENTS 10,805,925 B1 * 10/2020 Hwang ................. H04L 5/0073
2015/0327249 A1 11/2015 Kitazoe et al.
(Continued)

FOREIGN PATENT DOCUMENTS

CN 106233765 12/2016
CN 107645732 1/2018
WO 2018144927 8/2018

OTHER PUBLICATIONS

Nokia et al., "Consideration on Measurement Configuration in NR-NR-DC", 3GPP TSG-RAN WG2, R2-1812714, Meeting #103, Aug. 2018, Gothenburg, Sweden, 2 pgs.
(Continued)

*Primary Examiner* — Gregory B Sefcheck
*Assistant Examiner* — Majid Esmaeilian
(74) *Attorney, Agent, or Firm* — Kowert, Hood, Munyon, Rankin & Goetzel, P.C.

(57) ABSTRACT

Embodiments of a Next Generation Node-B (gNB), User Equipment (UE) and methods of communication are generally described herein. A Master gNB (MgNB) may be arranged to operate in accordance with a New Radio (NR)-NR Dual Connectivity (NR-NR DC) arrangement with a Secondary gNB (SgNB). If the UE does not support per-frequency (per-FR) measurement gaps, the MgNB may configure a per-UE measurement gap for the UE for measurement of signals in a first frequency range and in a second frequency range. If the UE supports the per-FR measurement gaps, the MgNB may configure a first measurement gap in the first frequency range, and the SgNB may configure a second measurement gap in the second frequency range.

20 Claims, 5 Drawing Sheets

(56) References Cited

U.S. PATENT DOCUMENTS

| | | | | |
|---|---|---|---|---|
| 2016/0295583 | A1 | 10/2016 | Kazmi et al. | |
| 2018/0034598 | A1 | 2/2018 | Mu et al. | |
| 2018/0192432 | A1 | 7/2018 | Tenny et al. | |
| 2018/0324663 | A1* | 11/2018 | Park | H04W 36/38 |
| 2019/0182880 | A1* | 6/2019 | Yang | H04L 5/0044 |
| 2019/0246306 | A1* | 8/2019 | Yang | H04L 27/26 |
| 2019/0253909 | A1* | 8/2019 | Yiu | H04W 72/0453 |
| 2019/0313271 | A1* | 10/2019 | Yiu | H04W 72/04 |
| 2020/0169341 | A1* | 5/2020 | Hwang | H04B 17/318 |
| 2020/0259618 | A1* | 8/2020 | Yang | H04W 72/0453 |
| 2020/0267586 | A1* | 8/2020 | Hwang | H04W 48/16 |
| 2020/0396704 | A1* | 12/2020 | Dalsgaard | H04W 24/10 |
| 2021/0021355 | A1* | 1/2021 | Hwang | H04B 17/327 |
| 2021/0051618 | A1* | 2/2021 | Yang | H04W 48/08 |
| 2021/0058996 | A1* | 2/2021 | Yang | H04W 56/001 |
| 2021/0105677 | A1* | 4/2021 | Jang | H04W 76/28 |
| 2021/0250851 | A1* | 8/2021 | Dalsgaard | H04L 5/0048 |
| 2021/0337414 | A1* | 10/2021 | Yilmaz | H04W 40/02 |
| 2021/0410024 | A1* | 12/2021 | Tang | H04W 36/0088 |

OTHER PUBLICATIONS

Nokia et al., "Consideration on Measurement Configuration in NE-DC", 3GPP TSG-RAN WG2, R2-1812710, Meeting #103, Aug. 2018, Gothenburg, Sweden, 3 pgs.

Ericsson, "Overview of RRM Requirements for NR-NR DC", 3GPP Tsg ran WG4, R4-1810784, Meeting #88, Aug. 2018, Gothenburg, Sweden, 3 pgs.

International Search Report and Written Opinion for International Application No. PCT/US2019/052695, mailed Jan. 15, 2020, 8 pgs.

Office Action for CN Patent Application No. 2019800609557; Feb. 28, 2024.

"Measurement Gap for MR-DC"; 3GPP TSG-RAN WG2 #100 R2-1713555; Nov. 27, 2017.

Intellectual Property of India; First Examination Report; Application No. 202117007658; mailed Feb. 14, 2022; 7 pgs.

Intel Corporation, "Measurement Gap in NR"; 3GPP TSG RAN WG2, Meeting #100; R2-1712650; Reno, Nevada; Nov. 2017; 8 pgs.

Mediatek Inc., "Gap for Intra-Frequency Measurement and Gap Sharing"; 3GPP TSG-RAN WG4; Meeting #85; R4-1712396; Reno, Nevada; Nov. 2017; 7 pgs.

Korean Office Action; Application No. 10-2021-7007747; mailed Mar. 21, 2022; 12 pgs.

NTT Docomo, Inc., "Measurement Gap for MR-DC", 3GPP Tsg-ran WG2 #100, R2-1713555, Nov.-Dec. 2017, Reno, USA, 6 pgs.

Extended European Search Report for European Application No. 19867417.8, mailed Aug. 20, 2021, 12 pgs.

CMCC; Assistance Information for Measurement Gap Configuration; 3GPP TSG-RAN WG2 NR AdHoc 1801; Jan. 22-Jan. 26, 2018; R2-1801260; Vancouver, Canada.

* cited by examiner

CONFIGURATION OF MEASUREMENT GAPS IN NEW RADIO (NR)-NR DUAL CONNECTIVITY (NR-NR DC) ARRANGEMENTS

PRIORITY CLAIM

This application is a United States National Stage filing of International Application No. PCT/US2019/052695, filed Sep. 24, 2019, which claims the benefit of priority to U.S. Provisional Patent Application Ser. No. 62/735,711, filed Sep. 24, 2018, each of which is incorporated herein by reference in its entirety.

TECHNICAL FIELD

Embodiments pertain to wireless communications. Some embodiments relate to wireless networks including 3GPP (Third Generation Partnership Project) networks, and 3GPP UTE (Long Term Evolution) networks, Fifth Generation (5G) networks, and/or New Radio (NR) networks. Some embodiments relate to measurement gaps, including per-frequency (per-FR) measurements gaps and per User Equipment (per-UE) measurement gaps. Some embodiments relate to methods to configure measurement gaps in NR-NR Dual Connectivity (NR-NR DC) arrangements.

BACKGROUND

Efficient use of the resources of a wireless network is important to provide bandwidth and acceptable response times to the users of the wireless network. However, often there are many devices trying to share the same resources and some devices may be limited by the communication protocol they use or by their hardware bandwidth. Moreover, wireless devices may need to operate with both newer protocols and with legacy device protocols.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
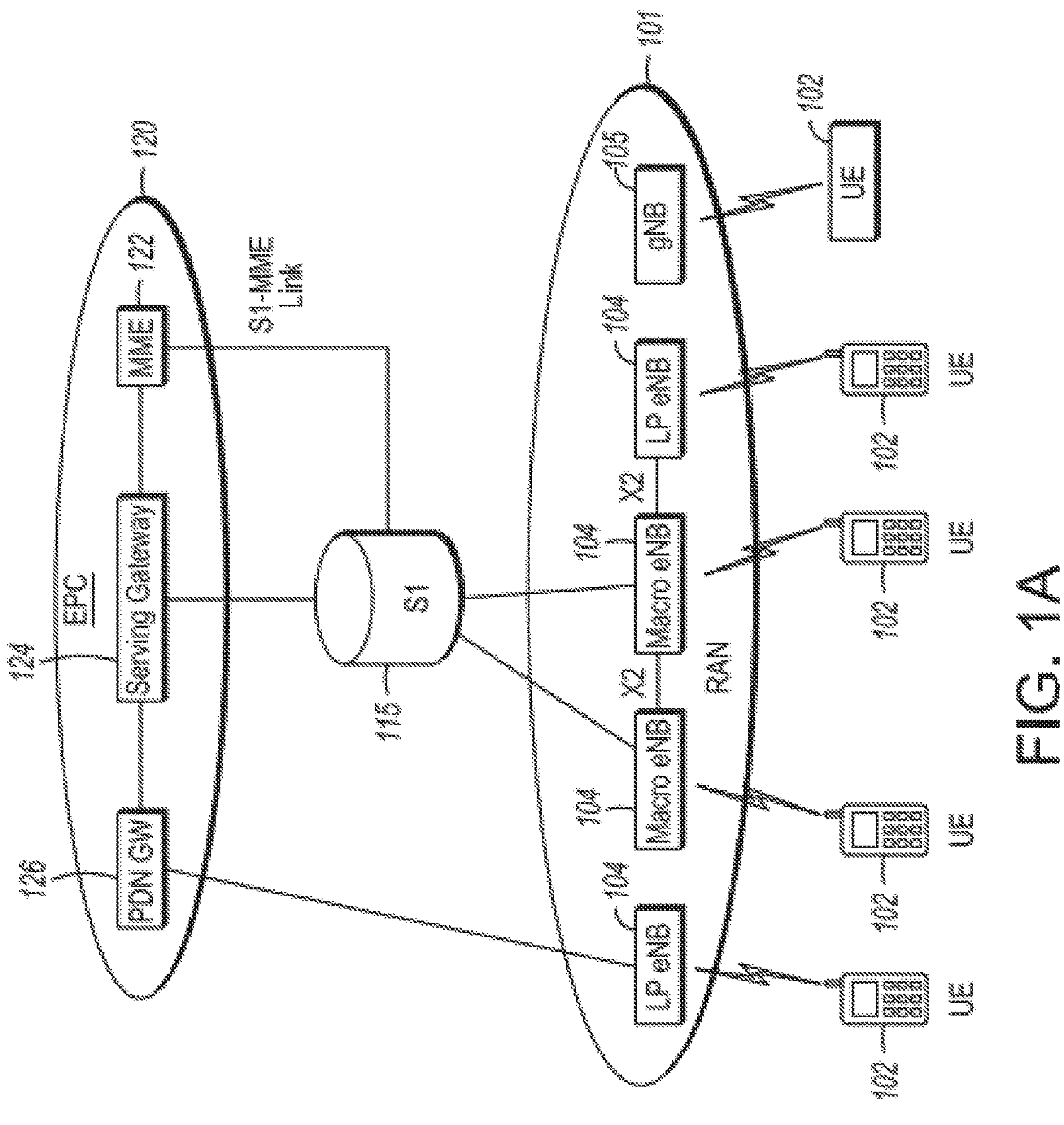
FIG. 1A is a functional diagram of an example network in accordance with some embodiments.
Figure 1B:
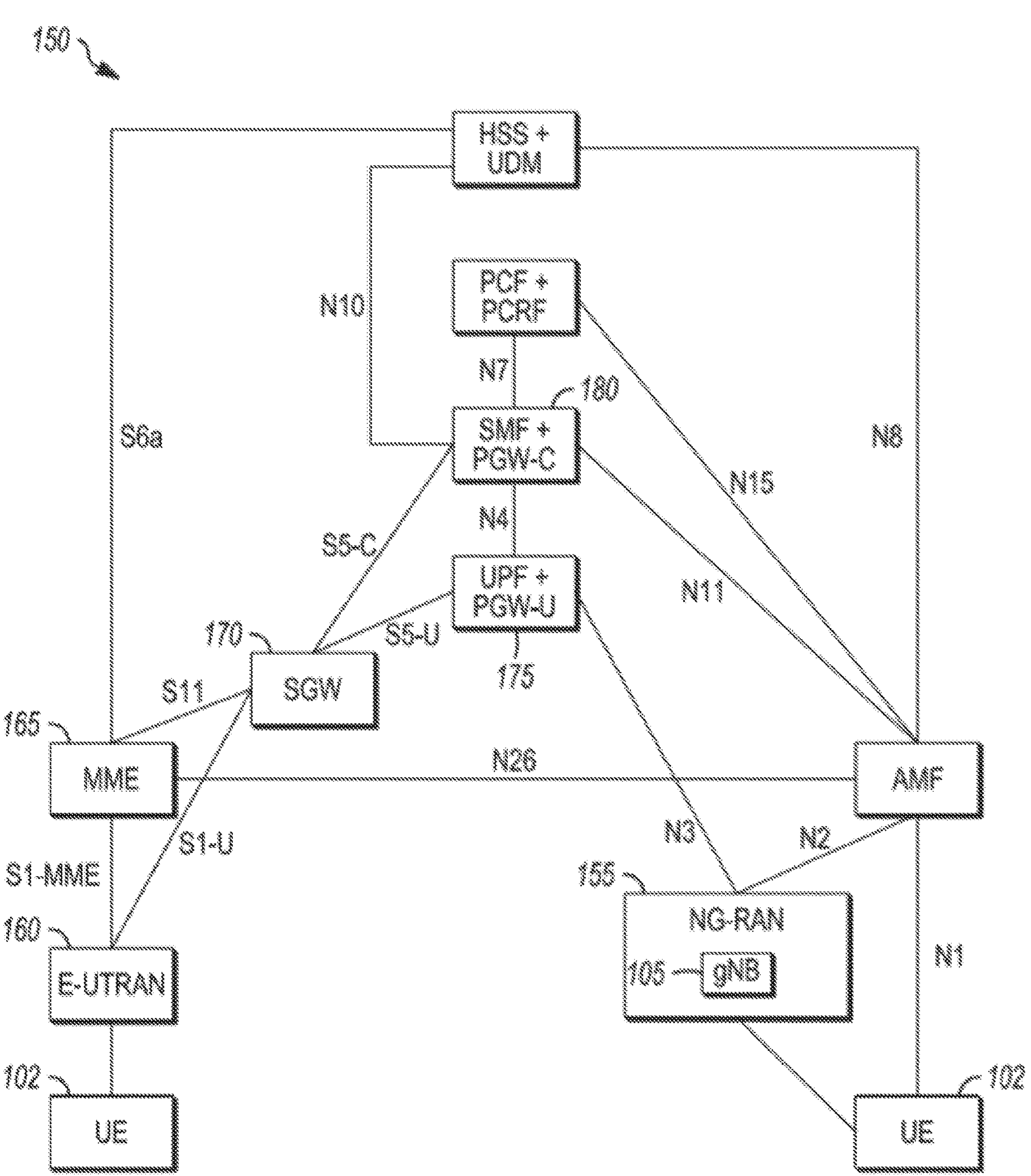
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B, In some embodiments, the network 100 may be a Third. Generation Partnership Project (3GPP) network. In some embodiments, the network 150 may be a 3GPP network, a new radio (NR) network and/or Fifth Generation (5G) network. Other networks may be used in some embodiments. In some embodiments, a network may include one or more of: one or more components shown in FIG. 1A; one or more components shown in FIG. 1B; and one or more additional components. Some embodiments may not necessarily include all components shown in FIG. 1A and FIG. 1B.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In some embodiments, the RAN 101 may include one or more of: one or more components of an evolved universal terrestrial radio access network (E-UTRAN), one or more components of an NR network, and/or one or more other components.

The core network 120 may include a mobility management entity (MME) 122, a serving gateway (serving GW) 124, and packet data network gateway (PDN GW) 126. In some embodiments, the networks 100, 150 may include (and/or support) one or more Evolved Node-B's (eNBs) 104 and/or one or more Next Generation Node-B's (gNBs) 105. The eNBs 104 and/or gNBs 105 may operate as base stations for communicating with User Equipment (UE) 102. In some embodiments, one or more eNBs 104 may be configured to operate as gNBs 105. Embodiments are not limited to the number of eNBs 104 shown in FIG. 1A or to the number of gNBs 105 shown in FIG. 1B. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with one or more of: a 3GPP LIE protocol/standard, an NR protocol/standard, a Fifth Generation (5G) protocol/standard; and/or other protocol/standard, although the scope of embodiments is not limited in this respect.

Descriptions herein of one or more operations, techniques and/or methods practiced by a component (such as the UE 102, eNB 104, gNB 105 and/or other) are not limiting. In some embodiments, one or more of those operations, techniques and/or methods may be practiced by another component.

The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. The serving GW 124 and the MME 122 may be implemented in one physical node or separate physical nodes.

In some embodiments, UEs 102, the eNB 104 and/or gNB 105 may be configured to communicate Orthogonal Frequency Division Multiplexing (OFDM) communication signals over a multicarrier communication channel in accordance with an Orthogonal Frequency Division Multiple Access (OFDMA) communication technique.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165, which may be similar to the MME 122 described herein, although the scope of embodiments is not limited in this respect, In some embodiments, the network 150 may include the SGW 170, which may be similar to the SGW 124 described herein, although the scope of embodiments is not limited in this respect.

Embodiments are not limited to the number or type of components shown in FIG. 1B. Embodiments are also not limited to the connectivity of components shown in FIG, 1B.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
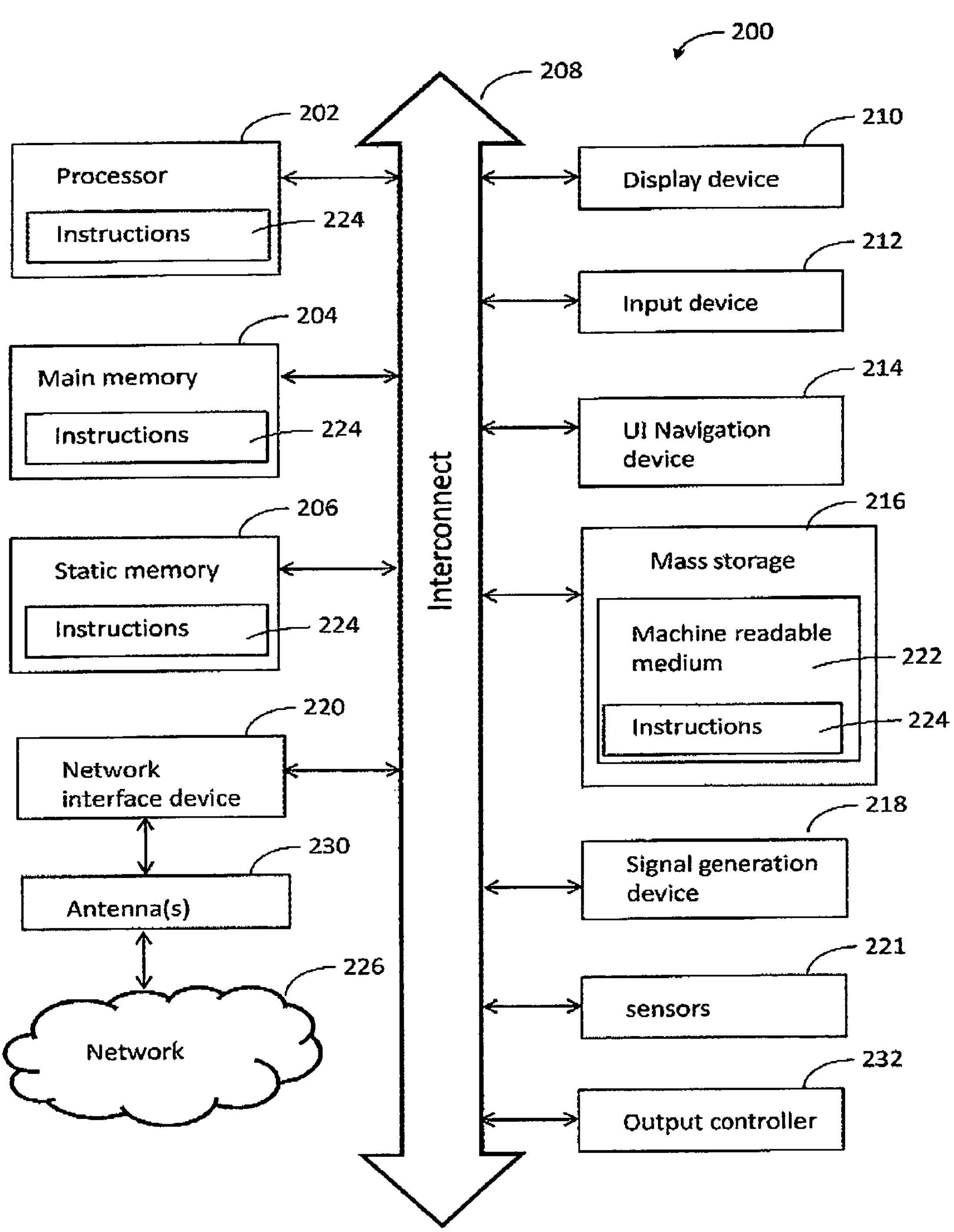
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. The machine 200 may be a UE 102, eNB 104, gNB 105, access point (AP), station (STA), user, device, mobile device, base station, another device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include one or more of 210-228.

The storage device 216 may include a machine readable medium 222. on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVI)-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
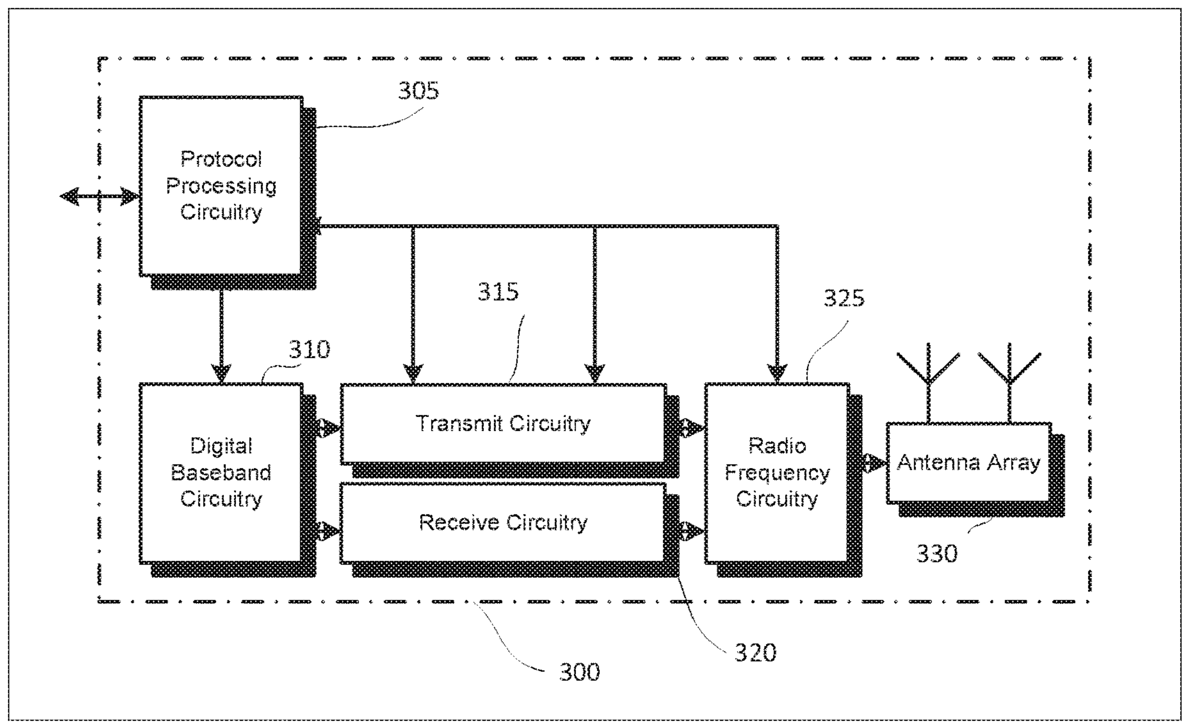
FIG. 3 illustrates an exemplary communication circuitry according to some aspects.

FIG. 3 illustrates an exemplary communication circuitry according to some aspects. It should be noted that a device, such as a UE 102, eNB 104, gNB 105, the machine 200 and/or other device may include one or more components of the communication circuitry 300, in some aspects. The communication circuitry 300 may include protocol processing circuitry 305, which may implement one or more of: medium access control (MAC), radio link control (RLC), packet data convergence protocol (PDCP), radio resource control (RRC) and non-access stratum (NAS) functions. The communication circuitry 300 may further include digital baseband circuitry 310, which may implement one or more physical layer (PHY) functions. The communication circuitry 300 may further include transmit circuitry 315, receive circuitry 320 and/or antenna array circuitry 330. The communication circuitry 300 may further include radio frequency (RF) circuitry 325. In an aspect of the disclosure, RF circuitry 325 may include multiple parallel RF chains for one or more of transmit or receive functions, each connected to one or more antennas of the antenna array 330.

In some embodiments, processing circuitry may perform one or more operations described herein and/or other operation(s). In a non-limiting example, the processing circuitry may include one or more components such as the processor 202, protocol processing circuitry 305, digital baseband circuitry 310, similar component(s) and/or other component (s).

In some embodiments, a transceiver may transmit one or more elements (including but not limited to those described herein) and/or receive one or more elements (including but not limited to those described herein). In a non-limiting example, the transceiver may include one or more components such as transmit circuitry 315, receive circuitry 320, radio frequency circuitry 325, similar component(s) and/or other component(s).

Although the UE 102, eNB 104, gNB 105, machine 200 and/or other device described herein may each be illustrated as having several separate functional elements, one or more of the functional elements may be combined and may be implemented by combinations of software-configured elements, such as processing elements including digital signal processors (DSPs), one or more microprocessors, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, machine 200, and/or other device may include various components shown in FIGS. 2-3 and/or other components. Accordingly, techniques and operations described herein that are performed by a device may be performed by an apparatus of the device, in some embodiments.

In accordance with some embodiments, a Master Next Generation Node-B (MgNB) 105 may be arranged to operate in accordance with a New Radio (NR)-NR Dual Connectivity (NR-NR DC) arrangement with a Secondary Next Generation Node-B (SgNB) 105. The MgNB 105 may receive, from a User Equipment (UE) 102, UE capability information that indicates whether the UE 102 supports per-frequency (per-FR) measurement gaps. Each per-FR measurement gap may be for signal measurements in one frequency range. If the MgNB 105 operates in a first frequency range and a second frequency range, and if the SgNB 105 operates in the second frequency range, and if the UE 102 does not support the per-FR measurement gaps, the MgNB 105 may transmit, to the UE 102, radio resource control (RRC) signaling that configures a per-UE measurement gap for measurement of signals in both the first and second frequency ranges. If the MgNB 105 operates in the first frequency range and the second frequency range, and if the SgNB 105 operates in the second frequency range, and if the UE 102 supports the per-FR measurement gaps, the MgNB 105 may: transmit, to the UE 102, RRC signaling that configures a first per-FR measurement gap for the first frequency range; and transmit, to the SgNB 105, additional signaling that indicates that the SgNB 105 is to configure a second. per-FR measurement gap for the UE 102 for the second frequency range. These embodiments are described in more detail below.

Figure 4:
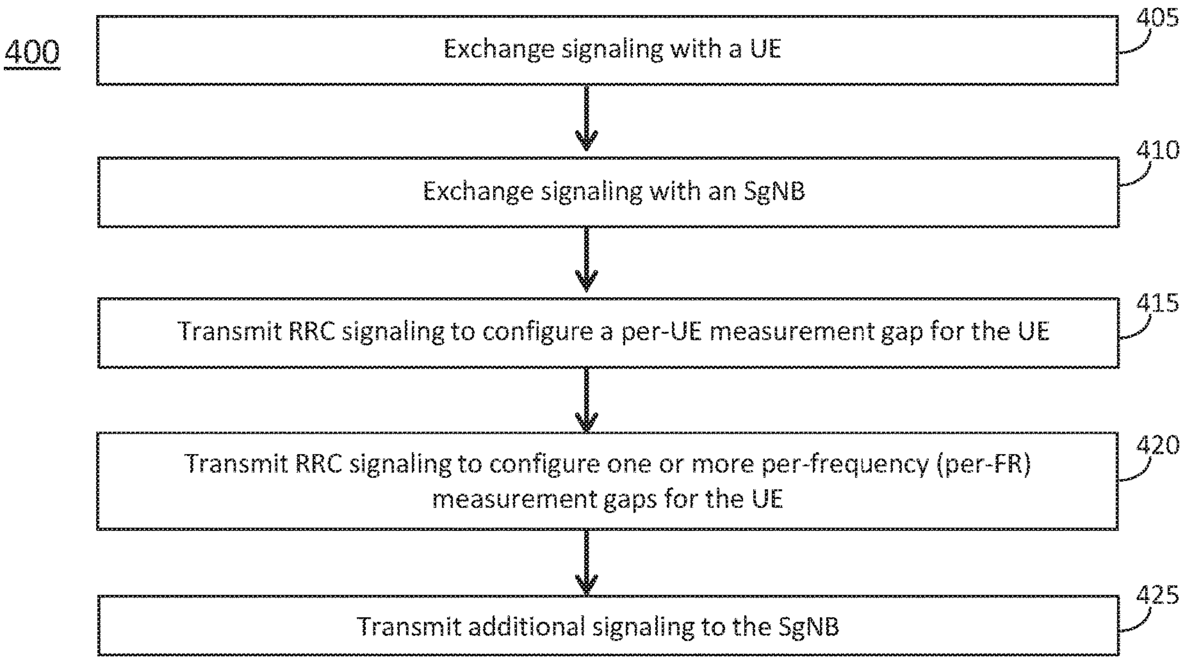
FIG. 4 illustrates the operation of a method of communication in accordance with some embodiments.
Figure 5:
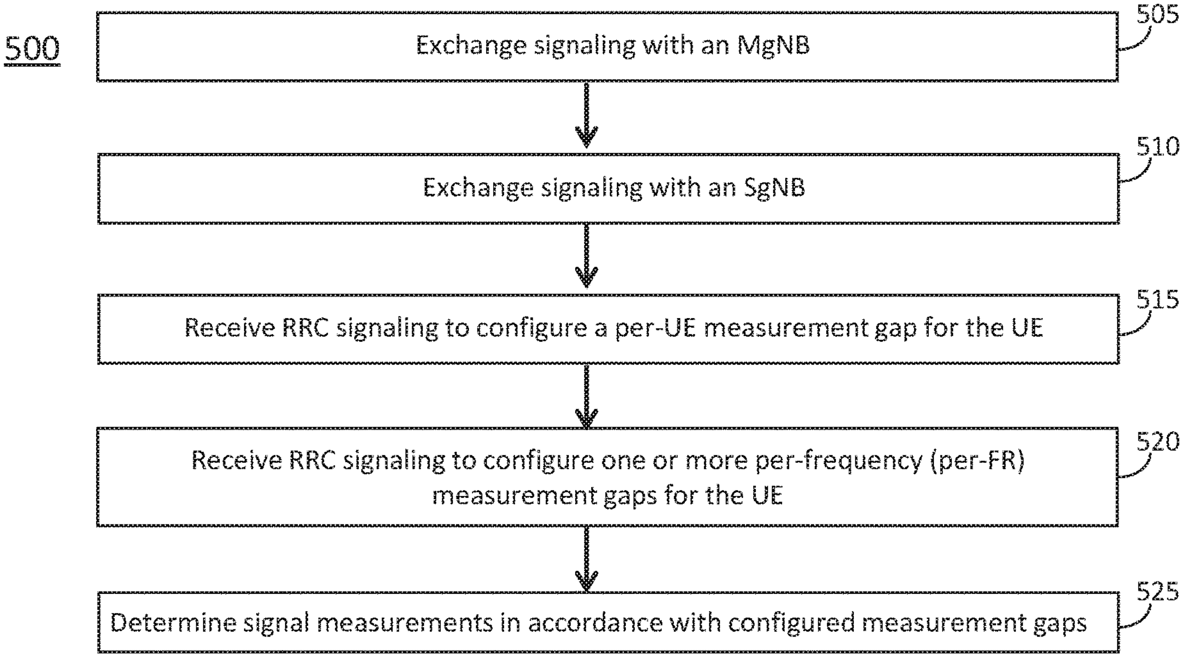
FIG. 5 illustrates the operation of a method of communication in accordance with some embodiments.

FIG. 4 illustrates the operation of a method of communication in accordance with some embodiments. FIG. 5 illustrates the operation of another method of communication in accordance with some embodiments. It is important to note that embodiments of the methods 400, 500 may include additional or even fewer operations or processes in comparison to what is illustrated in FIGS. 4-5. In addition, embodiments of the methods 400, 500 are not necessarily limited to the chronological order that is shown in FIGS. 4-5. In describing the methods 400, 500, reference may be made to one or more figures, although it is understood that the methods 400, 500 may be practiced with any other suitable systems, interfaces and components.

In some embodiments, an MgNB 105 may perform one or more operations of the method 400, but embodiments are not limited to performance of the method 400 and/or operations of it by the MgNB 105. In some embodiments, another device and/or component (such as the UE 102, SgNB 105, gNB 105, eNB 104 and/or other) may perform one or more operations of the method 400. In some embodiments, another device and/or component (such as the UE 102, SgNB 105, gNB 105, eNB 104 and/or other) may perform one or more operations that may be similar to, related to and/or reciprocal to one or more operations of the method 400. In a non-limiting example, the SgNB 105 may perform an operation that may be the same as, similar to, reciprocal to and/or related to an operation of the method 400, in some embodiments. In another non-limiting example, the UE 102 may perform an operation that may be the same as, similar to, reciprocal to and/or related to an operation of the method 400, in some embodiments.

In some embodiments, a UE 102 may perform one or more operations of the method 500, but embodiments are not limited to performance of the method 500 and/or operations of it by the UE 102. in some embodiments, another device and/or component (such as the MgNB 105, SgNB 105, gNB 105, eNB 104 and/or other) may perform one or more operations of the method 500. In some embodiments, another device and/or component (such as the MgNB 105, SgNB 105, gNB 105, eNB 104 and/or other) may perform one or more operations that may be similar to, related to and/or reciprocal to one or more operations of the method 500, In a non-limiting example, the MgNB 105 and/or SgNB 105 may perform an operation that may be the same as, similar to, reciprocal to and/or related to an operation of the method 500, in some embodiments.

It should be noted that one or more operations of one method (such as 400, 500 and/or others described herein) may be the same as, similar to, related to and/or reciprocal to one or more operations of another method (such as 400, 500 and/or others described herein). For instance, an operation of the method 400 may be the same as, similar to, related to and/or reciprocal to an operation of the method 500, in some embodiments. In a non-limiting example, an operation of the method 400 may include transmission of an element (such as a frame, block, message and/or other) by the MgNB 105, and an operation of the method 500 may include reception of the same element (and/or similar element) by the UE 102. In another non-limiting example, an operation of the method 400 may include transmission of an element (such as a frame, block, message and/or other) by the MgNB 105, and an operation of another method may include reception of the same element (and/or similar element) by the SgNB 105. In some cases, at least some of the descriptions of operations and techniques described as part of one method (such as 400, 500 and/or others described herein) may be relevant to another method (such as 400, 500 and/or others described herein).

The methods 400, 500 and other methods described herein may refer to eNBs 104, gNBs 105 and/or UEs 102 operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the methods 800, 900 and other methods described herein may be practiced by wireless devices configured to operate in other suitable types of wireless communication systems, including systems configured to operate according to various WEE standards such as IEEE 802.11. The methods 400, 500 may also be applicable to an apparatus of an MgNB 105, an apparatus of an SgNB 105, an apparatus of a UE 102, an apparatus of an eNB 104, an apparatus of a gNB 105 and/or an apparatus of another device described above.

In some embodiments, an apparatus of a device (including but not limited to the UE 102, eNB 104, gNB 105 and/or other) may comprise memory that is configurable to store one or more elements, and the apparatus may use them for performance of one or more operations. The apparatus may include processing circuitry, which may perform one or more operations (including but not limited to operation(s) of the method 400 and/or other methods described herein). The processing circuitry may include a baseband processor. The baseband circuitry and/or the processing circuitry may perform one or more operations described herein. The apparatus may include a transceiver to transmit and/or receive one or more blocks, messages and/or other elements.

Embodiments are not limited by references herein to transmission, reception and/or exchanging of elements such as frames, messages, requests, indicators, signals or other elements. In some embodiments, such an element may be generated, encoded or otherwise processed by processing circuitry for transmission by a transceiver or other component cases. In some embodiments, such an element may be received by a transceiver or other component, and may be decoded, detected or otherwise processed by processing circuitry. In some embodiments, the processing circuitry and the transceiver may be included in a same apparatus. In some embodiments, the transceiver may be separate from the apparatus that comprises the processing circuitry, in some embodiments.

One or more of the elements (such as messages, operations and/or other) described herein may be included in a 3GPP protocol, 3GPP UTE protocol, 4G protocol, 5G protocol, NR protocol and/or other protocol, but embodiments are not limited to usage of those elements. In some embodiments, other elements may be used, including other element(s) in a same standard/protocol, other element(s) in another standard/protocol and/or other. In addition, the scope of embodiments is not limited to usage of elements that are included in standards.

In some embodiments, the UE 102, eNB 104 and/or gNB 105 may be arranged to operate in accordance with a 3GPP protocol, NR protocol, and/or other protocol.

In some descriptions herein, references may be made to performance of one or more techniques, operations and/or methods by an MgNB 105, but such references are not limiting. In some embodiments, one or more of those techniques, operations and/or methods may be performed by one or more of: a gNB 105, a gNB 105 configurable to operate as an MgNB 105, a gNB 105 configured to operate as an MgNB 105, a gNB 105 that operates as an MgNB 105, and/or other.

At operation 405, the MgNB 105 may exchange signaling (such as RRC signaling, control signaling and/or other signaling) with the UE 102. At operation 410, the MgNB 105 may exchange signaling (such as RRC signaling, control signaling and/or other signaling) with the SgNB 105. At operation 415, the MgNB 105 may transmit RRC signaling to configure a per-UE measurement gap for the UE 102. At operation 420, the MgNB 105 may transmit RRC signaling to configure one or more per-frequency (per-FR) measurement gaps for the UE 102. At operation 425, the MgNB 105 may transmit additional signaling to the SgNB 105.

In some embodiments, the MgNB 105 may be arranged to operate in accordance with an NR-NR Dual Connectivity (NRNRDC) arrangement with an SgNB 105. The MgNB 105 may receive, from a UE 102, UE capability information that indicates whether the UE 102 supports per-frequency (per-FR) measurement gaps, each per-FR measurement gap for signal measurements in one frequency range. In some cases, the MgNB 105 may operate in a first frequency range and a second frequency range, and the SgNB 105 may operate in the second frequency range. If the UE 102 does not support the per-FR measurement gaps, the MgNB 105 may transmit, to the UE 102, radio resource control (RRC) signaling that configures a per-UE measurement gap for measurement of signals in both the first and second frequency ranges. If the UE 102 supports the per-FR measurement gaps, the MgNB 105 may perform one or more of: transmit, to the UE 102, RRC signaling that configures a first per-FR measurement gap for the first frequency range; transmit, to the SgNB 105, additional signaling that indicates that the SgNB 105 is to configure a second per-FR measurement gap for the UE 102. for the second frequency range; and/or other. It should be noted that the cases described above may include, but are not limited to, cases in which the SgNB 105 operates in the second frequency range and does not operate in the first frequency range, although the scope of embodiments is not limited in this respect.

In some cases, the MgNB 105 may operate in a first frequency range and a second frequency range, and the SgNB 105 may operate in the second frequency range. If the UE 102 supports the per-FR measurement gaps, the MgNB 105 may select either a first option or a second option for configuration of the second per-FR measurement gap for the UE 102 for the second frequency range. in the first option, the MgNB 105 may encode the RRC signaling that configures the first per-FR measurement gap to further configure the second per-FR measurement gap. In the second option, the MgNB 105 may encode the additional signaling (that is transmitted to the SgNB 105) to indicate that the SgNB 105 is to configure the second per-FR measurement gap. In some embodiments, the SgNB 105 may configure the second per-FR measurement gap in the second option. It should be noted that the cases described above may include, but are not limited to, cases in which the SgNB 105 operates in the second frequency range and does not operate in the first frequency range, although the scope of embodiments is not limited in this respect.

In sonic cases, the MgNB 105 and the SgNB 105 operate in the first frequency range, and the NgNB 105 and the SgNB 105 do not operate in the second frequency range. In some embodiments, the MgNB 105 may perform one or more of the following in such cases. If the UE 102 does not support the per-FR measurement gaps, the MgNB 105 may transmit, to the UE 102, RRC signaling that configures a per-UE measurement gap for measurement of signals in both the first and second frequency ranges. If the UE 102 supports the per-FR measurement gaps, the MgNB 105 may transmit, to the UE 102, RRC signaling that configures a per-FR measurement gap for the first frequency range.

In some cases, the MgNB and the SgNB operate in the second frequency range, and the MgNB and the SgNB do not operate in the first frequency range. In some embodiments, the MgNB 105 may perform one or more of the following in such cases. If the UE 102 does not support the per-FR measurement gaps, the MgNB 105 may transmit, to the UE 102, RRC signaling that configures a per-UE measurement gap for measurement of signals in both the first and second frequency ranges. If the UE 102 supports the per-FR measurement gaps, the MgNB 105 may transmit, to the UE 102, RRC signaling that configures a per-FR measurement gap for the second frequency range.

In some cases, the MgNB and the SgNB operate in the second frequency range, and the MgNB and the SgNB do not operate in the first frequency range. In some embodiments, the MgNB 105 may perform one or more of the following in such cases. If the UE 102 does not support the per-FR measurement gaps, the MgNB 105 may transmit, to the UE 102, RRC signaling that configures a per-UE measurement gap for measurement of signals in both the first and second frequency ranges. If the UE 102 supports the per-FR measurement gaps, the MgNB 105 may transmit, to the UE 102, additional signaling that indicates that the SgNB 105 is to configure a per-FR measurement gap for the second frequency range. In some embodiments, in the cases described above, the SgNB 105 may configure the per-FR measurement gap for the second frequency range.

In some cases, the MgNB 105 operates in the second frequency range, and the SgNB 105 operates in the first frequency range. In some embodiments, the MgNB 105 may perform one or more of the following in such cases. If the UE 102 does not support the per-FR measurement gaps, the MgNB 105 may transmit, to the UE 102, RRC signaling that configures a per-UE measurement gap for measurement of signals in both the first and second frequency ranges. If the UE 102 supports the per-FR measurement gaps, the MgNB 105 may transmit, to the UE 102, RRC signaling that configures a first per-FR measurement gap for the first frequency range and further configures a second per-FR measurement gap for the second frequency range. It should be noted that the cases described above may include, but are not limited to, cases in which the MgNB 105 operates in the second frequency range and does not operate in the first frequency range, and the SgNB 105 operates in the first frequency range and does not operate in the second frequency range, although the scope of embodiments is not limited in this respect.

In sonic cases, the MgNB operates in the second frequency range, and the SgNB operates in the first frequency range. In some embodiments, the MgNB 105 may perform one or more of the following in such cases. If the UE 102 does not support the per-FR measurement gaps, the MgNB 105 may transmit, to the UE 102, RRC signaling that configures a per-UE measurement gap for measurement of signals in both the first and second frequency ranges. If the UE 102 supports the per-FR measurement gaps, the MgNB 105 may perform one or more of: transmit, to the UE 102, RRC signaling that configures a second per-FR measurement gap for the second frequency range; transmit, to the SgNB 105, additional signaling that indicates that the SgNB 105 is to configure a first per-FR measurement gap for the first frequency range; and/or other. In some embodiments, in the cases described above, the SgNB 105 may configure the first per-FR measurement gap for the first frequency range. It should be noted that the cases described above may include, but are not limited to, cases in which the MgNB 105 operates in the second frequency range and does not operate in the first frequency range, and the SgNB 105 operates in the first frequency range and does not operate in the second frequency range, although the scope of embodiments is not limited in this respect.

Some descriptions herein (including but not limited to descriptions for the methods 400 and 500) may refer to the first and second frequency ranges. In a non-limiting example, the first frequency range may be an FR1 frequency range, The FR1 frequency range may be located below 6 giga-hertz (GHz), although the scope of embodiments is not limited in this respect. The second frequency range may be an FR2 frequency range. The FR2 frequency range may be located in a microwave frequency range, although the scope of embodiments is not limited in this respect. Embodiments are not limited to the example frequency ranges given above, as any suitable frequency ranges may be used in some embodiments.

In some embodiments, the MgNB 105 may transmit signaling to configure synchronization signal block (SSB) measurements for at most one measurement object with a same SSB frequency and a same SSB subcarrier spacing.

In some embodiments, the MgNB 105 may transmit signaling to configure SSB measurements for a same SSB frequency, a same SSB subcarrier spacing, and a same SSB-based measurement timing configuration (SMTC).

In some embodiments, the MgNB 105 may be configured to exchange RRC signaling with the UE 102 independent of RRC signaling exchanged between the SgNB 105 and the UE 102.

In some embodiments, the SgNB 105 may be arranged to operate in accordance with an NR-NR DC arrangement with an MgNB 105. The SgNB 105 may receive, from the MgNB 105, signaling that indicates whether a UE 102 supports per-FR measurement gaps. Each per-FR measurement gap may be for signal measurements in one frequency range. If the UE 102 does not support the per-FR measurement gaps, the SgNB 105 may refrain from transmission of signaling to configure the per-FR measurement gaps or per-UE measurement gaps. If the UE 102 supports the per-FR measurement gaps, the SgNB 105 may receive additional signaling from the MgNB 105 that indicates whether the SgNB 105 is to configure a per-FR measurement gap in a frequency range in which the SgNB 105 operates. The frequency range may be either a first frequency range or a second frequency range, although the scope of embodiments is not limited in this respect. If the additional signaling indicates that the SgNB 105 is to configure a per-FR measurement gap, the SgNB 105 may transmit RRC signaling to the UE 102, wherein the RRC signaling may indicate configuration information for the per-FR measurement gap in the frequency range in which the SgNB 105 operates.

At operation 505, the UE 102 may exchange signaling (such as RRC signaling, control signaling and/or other signaling) with the MgNB 105. At operation 510, the UE 102 may exchange signaling (such as RRC signaling, control signaling and/or other signaling) with the SgNB 105, At operation 515, the UE 102 may receive RRC signaling to configure a per-UE measurement gap for the UE 102. At operation 520, the UE 102 may receive RRC signaling to configure one or more per-frequency (per-FR) measurement gaps for the UE 102. In some embodiments, at operation 520, the UE 102 may receive RRC signaling from the MgNB 105 and/or RRC signaling from the SgNB 105. At operation 525, the UE 102 may determine signal measurements in accordance with configured measurement gaps.

in some embodiments, the UE 102 may be arranged to operate in accordance with an NR-NR DC arrangement. In some embodiments, the NR-NR DC arrangement may include one or more of: communication between the UE 102 and the MgNB 105; communication between the UE 102 and the SgNB 105; and/or other.

In some embodiments, the UE 102 may transmit, to the MgNB 105, UE capability information that indicates whether the UE 102 supports per-FR measurement gaps. In some embodiments, each per-FR measurement gap may be for signal measurements in one frequency range, although the scope of embodiments is not limited in this respect. If the UE 102 does not support the per-FR measurement gaps, the UE 102 may perform measurements of signals received, during a per-UE measurement gap configured by RRC signaling from the MgNB 105, in both a first frequency range and a second frequency range. If the UE 102 supports the per-FR measurement gaps, and if the MgNB 105 and the SgNB 105 both operate in only one of the frequency ranges, of the first and second frequency range, the UE 102 may perform one or more of: perform first measurements of signals in the frequency range in which the MgNB 105 and the SgNB 105 both operate, during a per-FR gap configured by RRC signaling from the MgNB 105; perform second measurements of signals in the frequency range in which the MgNB 105 and the SgNB 105 do not operate, the second measurements performed independent of a per-FR gap; and/or other. For instance, if the MgNB 105 and the SgNB 105 both operate in the first frequency range but do not operate in the second frequency range, the UE 102 may perform measurements of signals in the first frequency range based on a per-FR gap configured by the MgNB 105, and may perform measurements of signals in the second frequency range independent of a per-FR gap.

In some embodiments, if the UE 102 supports the per-FR. measurement gaps, and if the MgNB operates in the first frequency range and the SgNB operates in the second frequency range, the UE 102 may perform one or more of: perform first measurements of signals in the first frequency range during a per-FR gap configured by RRC signaling from the MgNB 105; perform second measurements of signals in the second frequency range during a per-FR gap configured by RRC signaling from the MgNB 105 or the SgNB 105; and/or other.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method, comprising:

determining, based on a User Equipment (UE) support for per frequency range (FR) measurement gap for a first FR and a second FR, a per UE measurement gap configuration for the first FR and the second FR, or a per FR gap configuration for the first FR and the second FR, wherein a first node operates in accordance with a New Radio-New Radio Dual Connectivity (NR-NR DC) arrangement with a second node, wherein the first FR is an FRI frequency range located below 6 gigahertz (GHz), and wherein the second FR is an FR2 frequency range located in a frequency range above 6 GHz; and encoding, for transmission to the UE, radio resource control (RRC) signaling that configures a measurement gap for at least the first FR, wherein when the UE does not support per-FR measurement gaps, the measurement gap is a per UE measurement gap for measurement of signals in both the first FR and the second FR; and wherein, for each of the first node and the second node, for all synchronization signal block (SSB) based reporting configurations, there is at most one measurement object with the same SSB frequency and the same SSB subcarrier spacing.

2. The method of claim 1, wherein the first node operates in at least the first FR.

3. The method of claim 2, wherein the second node operates in the second FR.

4. The method of claim 1, wherein, when the UE does support per FR measurement gaps, the measurement gap is a first per-FR measurement gap for the first FR, and wherein the method further comprises:

encoding, for transmission to the second node, additional signaling that indicates that the second node is to configure a second per-FR measurement gap for the UE for the second FR.

5. The method of claim 1, further comprising:

encoding signaling to configure SSB measurements for the at most one measurement object with the same SSB frequency and the same SSB subcarrier spacing.

6. The method of claim 1, further comprising:

encoding, for transmission to the second node, signaling indicating that the UE supports the per FR measurement gap.

7. The method of claim 1, further comprising:

decoding signaling from the UE that includes capability information indicating whether the UE supports the per FR measurement gap for the first FR and the second FR.

8. An apparatus, comprising:

a memory; and at least one processor in communication with the memory and configured to cause a first node to:

determine, based on a User Equipment (UE) support for per frequency range (FR) measurement gap for a first FR and a second FR, a per UE measurement gap configuration for the first FR and the second FR, or a per FR gap configuration for the first FR and the second FR, wherein the first node operates in accordance with a New Radio-New Radio Dual Connectivity (NR-NR DC) arrangement with a second node, wherein the first FR is an FR1 frequency range located below 6 giga-hertz (GHz), and wherein the second FR is an FR2 frequency range located in a frequency range above 6 GHz; and encode, for transmission to the UE, radio resource control (RRC) signaling that configures a measurement gap for at least the first FR, wherein when the UE does not support per- FR measurement gaps, the measurement gap is a per UE measurement gap for measurement of signals in both the first FR and the second FR; and wherein, for each of the first node and the second node, for all synchronization signal block (SSB) based reporting configurations, there is at most one measurement object with the same SSB frequency and the same SSB subcarrier spacing.

9. The apparatus of claim 8, wherein the first node operates in at least the first FR.

10. The apparatus of claim 8, wherein the second node operates in the second FR.

11. The apparatus of claim 8, wherein, when the UE does support per FR measurement gaps, the measurement gap is a first per-FR measurement gap for the first FR, and wherein the at least one processor is further configured to cause a first node to:

encode, for transmission to the second node, additional signaling that indicates that the second node is to configure a second per-FR measurement gap for the UE for the second FR.

12. The apparatus of claim 8, wherein the at least one processor is further configured to cause a first node to:

encode signaling to configure SSB measurements for the at most one measurement object with the same SSB frequency and the same SSB subcarrier spacing.

13. The apparatus of claim 8, wherein the at least one processor is further configured to cause a first node to:

encode, for transmission to the second node, signaling indicating that the UE supports the per FR measurement gap.

14. The apparatus of claim 8, wherein the at least one processor is further configured to cause a first node to:

decode signaling from the UE that includes capability information indicating whether the UE supports the per FR measurement gap for the first FR and the second FR.

15. A non-transitory computer readable memory medium storing program instructions executable by a first node to:

determine, based on a User Equipment (UE) support for per frequency range (FR) measurement gap for a first FR and a second FR, a per UE measurement gap configuration for the first FR and the second FR, or a per FR gap configuration for the first FR and the second FR, wherein the first node operates in accordance with a New Radio-New Radio Dual Connectivity (NR-NR DC) arrangement with a second node, wherein the first FR is an FR1 frequency range located below 6 giga-hertz (GHz), and wherein the second FR is an FR2 frequency range located in a frequency range above 6 GHz; and encode, for transmission to the UE, radio resource control (RRC) signaling that configures a measurement gap for at least the first FR, wherein when the UE does not support per-FR measurement gaps, the measurement gap is a per UE measurement gap for measurement of signals in both the first FR and the second FR; and wherein, for each of the first node and the second node, for all synchronization signal block (SSB) based reporting configurations, there is at most one measurement object with the same SSB frequency and the same SSB subcarrier spacing.

16. The non-transitory computer readable memory medium of claim 15, wherein the first node operates in at least the first FR.

17. The non-transitory computer readable memory medium of claim 15, wherein the second node operates in the second FR.

18. The non-transitory computer readable memory medium of claim 15, wherein, when the UE does support per FR measurement gaps, the measurement gap is a first per-FR measurement gap for the first FR, and wherein the program instructions are further executable to cause the first node to:

encode, for transmission to the second node, additional signaling that indicates that the second node is to configure a second per-FR measurement gap for the UE for the second FR.

19. The non-transitory computer readable memory medium of claim 15, wherein the program instructions are further executable to cause the first node to:

encode signaling to configure SSB measurements for the at most one measurement object with the same SSB frequency and the same SSB subcarrier spacing.

20. The non-transitory computer readable memory medium of claim 15, wherein the program instructions are further executable to cause the first node to:

encode, for transmission to the second node, signaling indicating that the UE supports the per FR measurement gap.

* * * * *